United States Patent [19]

Paik et al.

[11] Patent Number: 5,319,145
[45] Date of Patent: Jun. 7, 1994

[54] METHOD FOR PREPARING POLYSUCCINIMIDES WITH A ROTARY TRAY DRYER

[75] Inventors: Yi H. Paik, Princeton, N.J.; Ethan S. Simon, Ambler; Graham Swift, Blue Bell, both of Pa.

[73] Assignee: Rohm and Haas Company, Philadelphia, Pa.

[21] Appl. No.: 911,867

[22] Filed: Jul. 10, 1992

[51] Int. Cl.$^5$ .............................................. C08G 69/10
[52] U.S. Cl. ...................................... 528/328; 528/310
[58] Field of Search ............................... 528/328, 310

[56] References Cited

U.S. PATENT DOCUMENTS

| | | | |
|---|---|---|---|
| 3,052,655 | 9/1962 | Fox et al. | 528/328 |
| 3,474,083 | 10/1969 | Shiga et al. | 260/112.5 |
| 3,728,797 | 4/1973 | Worden, Sr. et al. | 34/32 |
| 3,846,380 | 11/1974 | Fujimoto et al. | 260/78 A |
| 4,590,260 | 5/1986 | Harada et al. | 528/328 |
| 4,839,461 | 6/1989 | Boehmke | 528/363 |
| 4,996,292 | 2/1991 | Fox et al. | 528/328 |
| 5,057,597 | 10/1991 | Koskan | 528/328 |

FOREIGN PATENT DOCUMENTS 44-9394 4/1969 Japan.
52-8873 3/1977 Japan.

Primary Examiner—Harold D. Anderson
Attorney, Agent, or Firm—David T. Banchik

[57] ABSTRACT

A method for producing polysuccinimides is provided. A rotary tray operating at an internal temperature of from about 110 to about 300° C. and providing a residence time of from about 1 hour to about 10 hours is used in the polycondensation of one or more amino acids, amic acids or ammonium salts of monoethylenically unsaturated dicarboxylic acids to produce polysuccinimides.

6 Claims, No Drawings

METHOD FOR PREPARING POLYSUCCINIMIDES WITH A ROTARY TRAY DRYER

FIELD OF THE INVENTION

The present invention relates to a process for the manufacture of polysuccinimides and poly(amino acids), preferably poly(aspartic acid) and copolymers thereof using a rotary tray dryer.

BACKGROUND OF THE INVENTION

Poly(amino acids) such as poly(aspartic acid) are useful as additives for fertilizers, scale inhibitors, detergents, pigment and mineral dispersants, and corrosion and scale inhibitors in boilers and cooling towers. Poly(amino acids) have been synthesized by hydrolyzing the products of thermal polycondensation reactions of amino acids. Unfortunately, the known methods for the synthesis of poly(amino acids) are complex, expensive, or require excessively long process times.

A method for the synthesis of poly(aspartic acid) is disclosed in U.S. Pat. No. 4,839,461 to Boehmke. This process combines maleic acid or maleic anhydride and an ammonia solution in a molar ratio of 1:1–1.5. The mixture is then heated to 120°–150° C. and the resulting solution of ammonium salt and maleic acid is evaporated, leaving a crystal mash. The crystal mash is then melted, during which time the waters of condensation and crystallization distill off. A porous mass of poly(aspartic acid) results. The entire process requires six to eight hours to complete.

Another method for the synthesis of poly(amino acid) is disclosed in U.S. Pat. No. 5,057,597 to Koskan, et al. This process requires fluidizing an amino acid by agitation in a nitrogen atmosphere at a temperature of at least 180° C. for three to six hours. The resultant anhydropolyamino acid is then hydrolyzed to a poly(amino acid).

The prior art methods for the synthesis of polysuccinimides and poly(amino acids) are time consuming, complex or use large volumes of volatile organic solvents or inert gases. As used hereinafter and in the appended claims, "polysuccinimides" refers to polymeric materials which contain succinimide moieties in the polymer chain and may contain other moieties, and "polysuccinimide" refers to polymeric materials which contain only such moieties.

It is an object of this invention to provide a relatively simple process for the manufacture of polysuccinimides which can then be hydrolyzed to form poly(amino acids).

It is a further object of the present invention to provide a continuous process for preparing polysuccinimides.

SUMMARY OF THE INVENTION

The present invention provides a process for producing polysuccinimides by introducing into a rotary tray dryer one or more compounds selected from amino acids, amic acids and ammonium salts of monoethylenically unsaturated dicarboxylic acids, operating the rotary tray dryer so as to provide an internal temperature of from about 110 to about 300° C. and a residence time of from about 1 hour to about 10 hours, and removing the water formed by condensation of the one or more compounds.

DETAILED DESCRIPTION OF THE INVENTION

The amino acids which can be used in the present invention include aspartic acid, alanine, asparagine, glycine, glutamic acid, lysine, glutaric acid and combinations thereof. Preferred amino acids include aspartic acid, glutamic acid and combinations thereof. The amic acids which can be used in the present invention are the monoamides of monoethylenically unsaturated dicarboxylic acids. Suitable amic acids include the monoamides derived from ammonia or primary amines and the acid anhydride, esters or acyl halides of monoethylenically unsaturated dicarboxylic acids and combinations thereof. Preferably, the amic acids are maleamic acid (the monoamide of maleic acid), methylenesuccinamic acid (the monoamide of itaconic acid), and the monoamides of mesaconic acid, methylenemalonic acid, fumaric acid, citraconic acid, aconitic acid, alkylmaleic acids, alkenylsuccinic acids and combinations thereof. The most preferred amic acids are maleamic acid, methylenesuccinamic acid and combinations thereof. The ammonium salts of monoethylenically unsaturated dicarboxylic acids which can be used in the present invention are the partial and complete ammonium salts of monoethylenically unsaturated dicarboxylic acids. Suitable ammonium salts of monoethylenically unsaturated dicarboxylic acids include the partial and complete ammonium salts of maleic acid, itaconic acid, mesaconic acid, methylenemalonic acid, fumaric acid, citraconic acid, aconitic acid, alkylmaleic acids, alkenyisuccinic acids and combinations thereof. The preferred ammonium salts of monoethylenically unsaturated dicarboxylic acids are the ammonium salts of maleic acid.

The rotary tray dryers useful in the present invention are, for example, those taught in U.S. Pat. No. 3,728,797 to Worden, et. al., incorporated by reference herein. Particularly suitable are continuous rotary tray dryers of the type manufactured under the trademark TURBO-Dryer by the Wyssmont Company, Inc., assignees of the aforementioned patent. Continuous rotary tray dryers deliver material to an upper tray in the dryer through an inclined chute, and thereafter transfer the material through the dryer from tray to tray by passing it through inclined chutes which extend between vertically adjacent trays. Upon rotation of the trays, wiper arms associated with each tray guide the material over the laterally outer edges of the trays and into the upper ends of the inclined chutes, while additional wiper arms and leveler arms associated with each tray distribute the material transferred to the tray from the next highest tray evenly over the surface of the tray. Thus, the transfer of the material through the dryer is very gentle, and results in negligible breakage, minimum formation of fines and minimum adhesion of the material to the trays or to the transfer arms and chutes.

The polysuccinimides are produced by a thermal polycondensation reaction. The process utilizes heat and mild agitation to condense and polymerize the one or more amino acids, amic acids or ammonium salts of monoethylenically unsaturated dicarboxylic acids. The polycondensation reactions typically proceeds by polymerizing these compounds to form an anhydropolyamino acid by driving off the water formed from intermolecular condensation of these compounds as well as from internal cyclization. Thus, the water liberated during the reaction must be removed in order to drive the reaction toward completion. The polysuccinimides which results from the polycondensation of the one or more amino acids, amic acids or ammonium salts of monoethylenically unsaturated dicarboxylic acids can be used as is, or they be hydrolyzed, preferably using alkaline hydrolysis, to form a poly(amino acid).

The process utilizes conventional equipment that is commercially available to provide the mild agitation and heat required to manufacture polysuccinimides. Any rotary tray dryer that provides both mild agitation and heat is suitable for use in this process. The mild agitation provides contact of the one or more amino acids, amic acids or ammonium salts of monoethylenically unsaturated dicarboxylic acids with the growing polymer chains, assists in driving off the water formed from the polycondensation reaction, improves heat transfer and allows for shorter reaction times. The mild agitation occurs when the material falls between the vertically adjacent trays and when the material is leveled by the wiper blade. The rotary tray dryer is operated such that material is transferred between vertically adjacent trays at intervals of from about 1 minute to about 30 minutes. Furthermore, a sufficient number of trays must be present in the rotary tray dryer to provide a residence time for the material being polymerized of from about 1 hour to about ten hours. Mild agitation further reduces the loss of product and the risks associated with dusty, airborne materials.

The rotary tray dryer is equipped with a heating means, such as a heat jacket, internal heating coils or both, which provides heat for the polycondensation of the one or more amino acids, amic acids or ammonium salts of monoethylenically unsaturated dicarboxylic acids. The polycondensation is performed at an internal temperature of from about 110 to 300° C. Preferably, the internal temperature is at least 120° C. for the polycondensation of one or more ammonium salts of monoethylenically unsaturated dicarboxylic acids, at least 120° C. for the polycondensation of one or more amic acids, and at least 200° C. for the polycondensation of one or more amino acids.

The rotary tray dryer can be operated under subatmospheric, atmospheric or superatmospheric pressure. It is preferred to operate at atmospheric or subatmospheric pressure to assist the removal of water formed from the polycondensation reaction. The removal of water is also assisted by passing a continuous stream of air or nitrogen through the rotary tray dryer. Preferably, the polycondensation is conducted at atmospheric pressure with a continuous stream of heated air passing through the rotary tray dryer.

The following examples are embodiments of the general process discussed hereinabove and are intended by way of illustration only and are not intended to limit the invention in any way.

EXAMPLE 1

A 2-tray dryer having a movably positioned top tray and a movably positioned bottom tray wherein the vertical positions of the two trays could be switched, was preheated to provide an internal temperature of 240° C. and a continuous stream of heated air flowing at a rate of 300 cubic feet/minute was passed through the dryer. 1000 grams of L-aspartic acid was introduced into the top tray of the dryer, and the bed depth was adjusted to 1.5 inches. The material in top tray was transferred to the lower tray every ten minutes, then the vertical positions of the trays were switched. After 50 minutes, the bed depth was changed to 1.25 inches. After 70 minutes, the temperature of the material in the trays had reached 230° C. and the air flow was reduced to 250 cubic feet/minute. The total residence time was 6 hours. Analysis by $^1$H NMR spectroscopy indicated that greater than 95 percent by weight of the aspartic acid was converted to polysuccinimide. 700 grams of polysuccinimide was recovered as a tan, free-flowing powder.

EXAMPLE 2

The same procedure was followed as in Example 1 except that the internal temperature of the rotary tray dryer was 270° C. Analysis by $^1$H NMR spectroscopy indicated that the aspartic acid was completely converted to polysuccinimide.

We claim:

1. A continuous method for producing polysuccinimides comprising the steps of:
   continuously introducing into a rotary tray dryer one or more α-amino acids;
   operating the rotary tray dryer so as to provide an internal temperature of from about 120 to about 300° C. and a residence time of from about 1 hour to about 10 hours, and
   removing the water formed by condensation of the one or more compounds to produce polysuccinimides.

2. The method of claim 1 wherein the one or more α-amino acids are selected from the group consisting of: aspartic acid, aspargine, alanine, glycine, glutamic acid, and mixtures thereof.

3. The method of claim 1 wherein the one or more α-amino acids are selected from the group consisting of: aspartic acid, glutamic acid, and mixtures thereof.

4. The method of claim 1 wherein the one or more α-amino acids is aspartic acid.

5. The method of claim 1 wherein the internal temperature is at least 200° C.

6. A continuous method for producing polysuccinimides comprising the steps of:
   continuously introducing into a rotary tray dryer one or more α-amino acids and one or more compounds selected from the group consisting of: amic acids, ammonium salts of monoethylenically unsaturated dicarboxylic acids, and mixtures thereof;
   operating the rotary tray dryer so as to provide an internal temperature of from about 120 to about 300° C. and a residence time of from about 1 hour to about 10 hours; and
   removing the water formed by condensation of the one or more compounds to produce polysuccinimides.

* * * * *